UNITED STATES PATENT OFFICE.

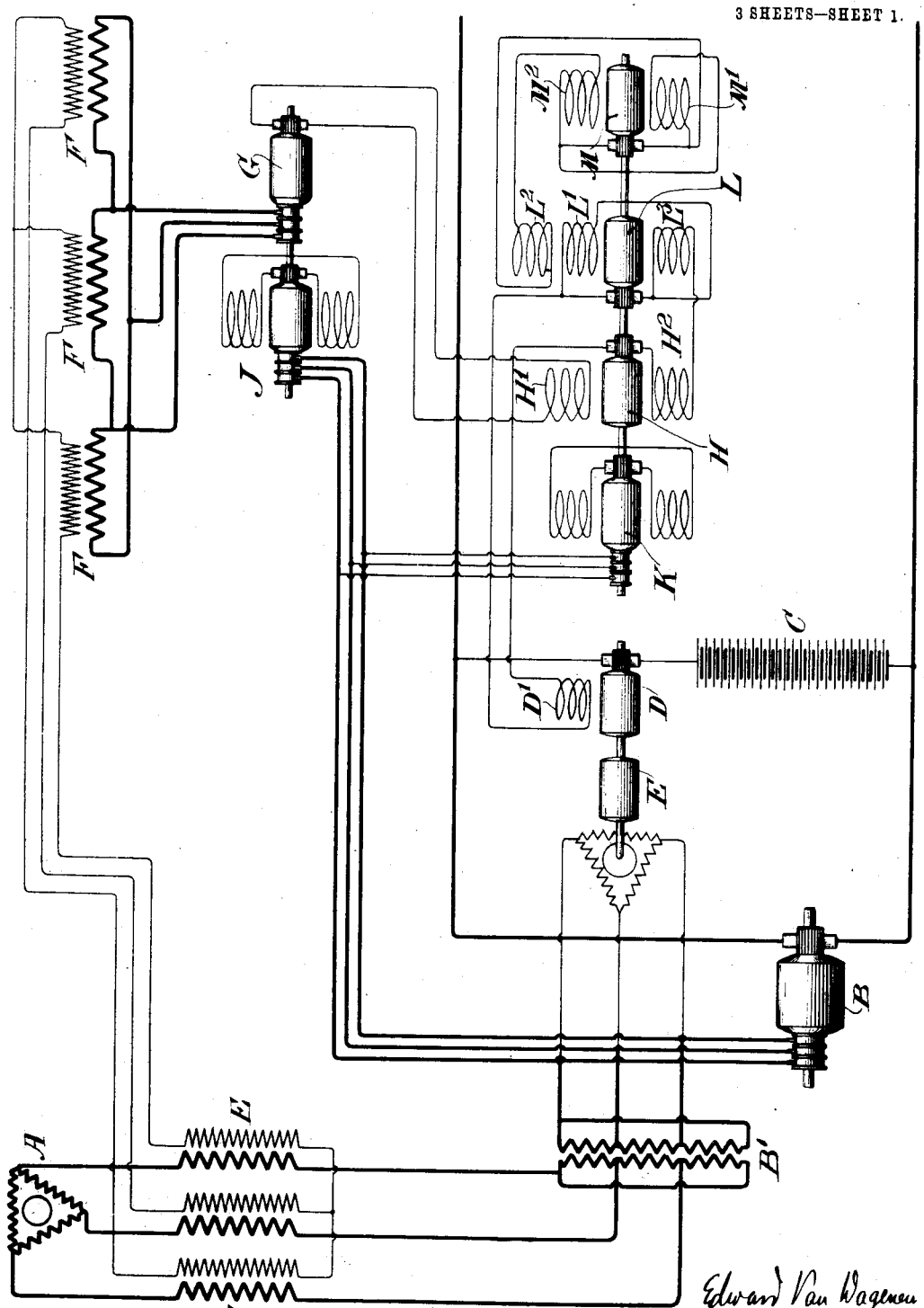

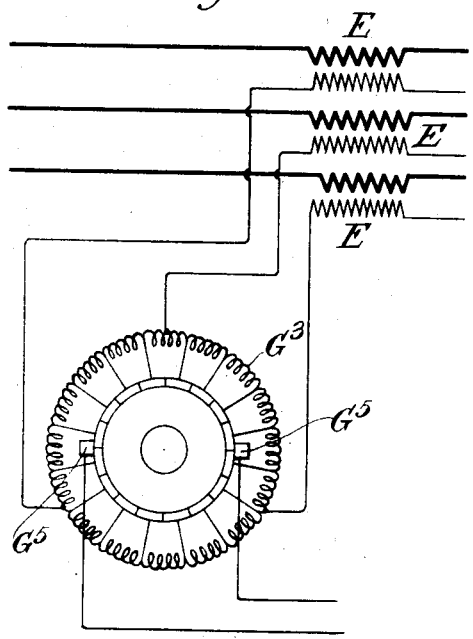
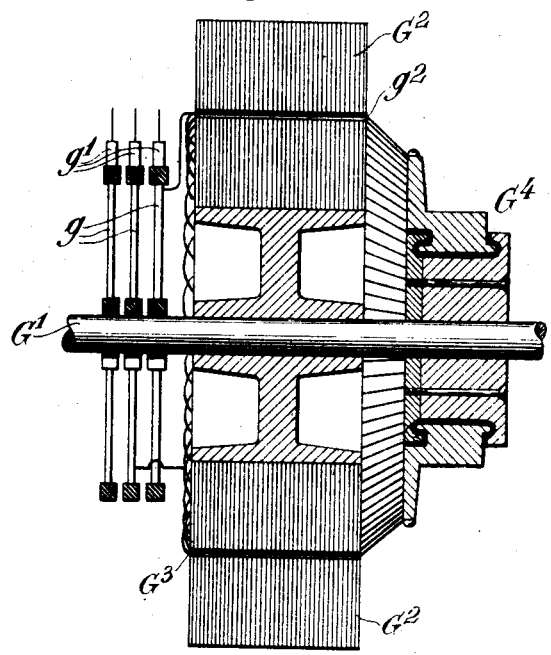
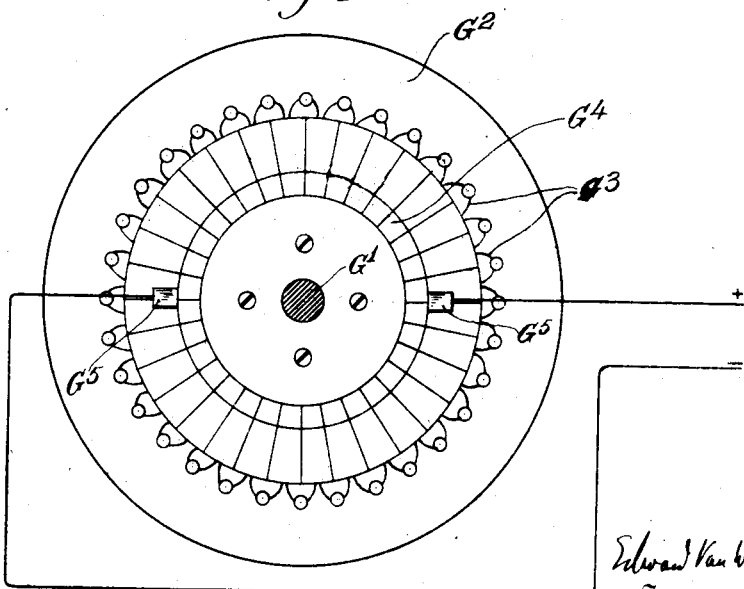

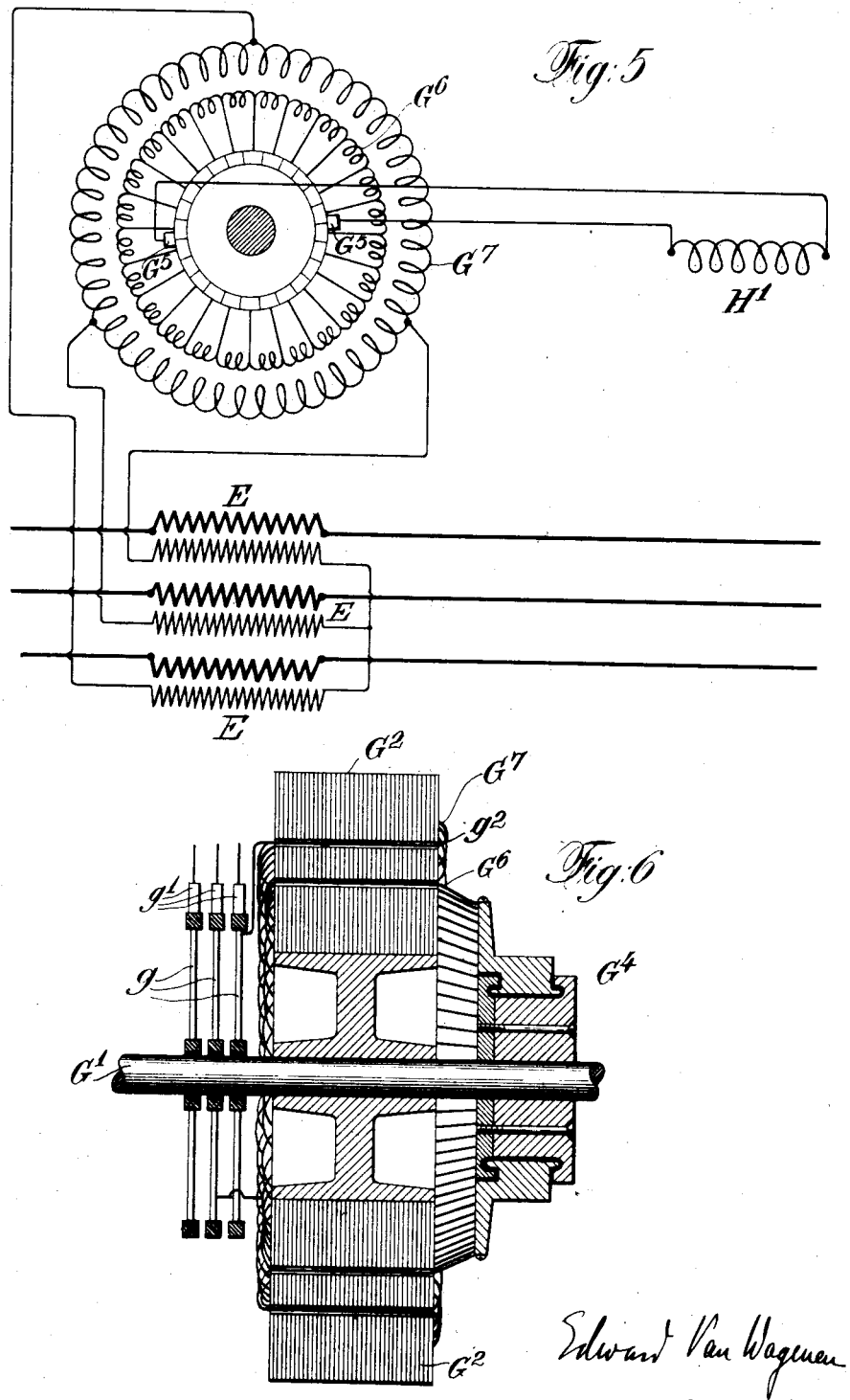

EDWARD VAN WAGENEN, OF NEW YORK, N. Y., ASSIGNOR TO GOULD STORAGE BATTERY COMPANY, A CORPORATION OF NEW YORK.

ELECTRICAL SYSTEM OF DISTRIBUTION.

No. 869,279.   Specification of Letters Patent.   Patented Oct. 29, 1907.

Application filed July 2, 1906. Serial No. 324,424.

*To all whom it may concern:*

Be it known that I, EDWARD VAN WAGENEN, a citizen of the United States, and a resident of the city, county, and State of New York, have invented certain new and useful Improvements in Electrical Systems of Distribution, of which the following is a specification.

My invention relates to electrical systems of distribution and especially to the automatic regulation of the same.

In the present instance the electrical system of distribution to which my various improvements have been applied is a system in which a storage battery and booster are employed in connection with a rotary converter or other rectifier device to steady the load on a main alternating current generator. The principal improvement herein shown in connection with this system applies to the proper rectification of the currents of the regulating portion of the system. This improvement is not, in its broadest phase, limited to this general character of system, but may be applied to other regulating circuits where portions thereof are arranged for alternating currents and other portions thereof arranged for direct currents.

Heretofore in systems where the regulating portion of the circuit was partly arranged for direct currents and partly for alternating currents the current has been rectified, or it has been proposed to rectify the current, by ordinary commutating devices or by rotary converters or motor generators. The former are objectionable both because the currents given out by such devices are not true continuous currents or alternating currents, as the case may be, being in the former case pulsating currents, and in the later case mere impulses in the opposite direction rather than sine waves, and also because the use of such commutating devices is attendant with troubles due to the sparking of the commutators when there is a change of power factor without adjustment of the brushes. The employment of rotary converters or motor generators is disadvantageous in any regulating circuit because of their constant liability to get out of step unless driven by an independent motor. Where, however, a separate motor is used to drive such a rotary the regulation cannot be satisfactory because the variable energy supplied to the rectifying device may be partly diverted to vary the load on the separate motor or even to drive the separate motor as a generator. By my invention I insure the delivery by the rectifier device of energy having a fixed relation to that delivered to the rectifier device. Thus if a direct current field coil, as in the present instance, is to be regulated by the fluctuations of an alternating current circuit, I am enabled by my invention to regulate such field in exact accordance with changes of current in the alternating current circuit while delivering to such direct current field a current that is substantially continuous, *i. e.*, has no substantial pulsations, and at the same time I avoid the sparking troubles incident to the use of ordinary commutating devices. To these ends I provide in the regulating circuit a rectifier comprising one or more sets of windings connected to the alternating current and the direct current sides of the regulating portions of the system, such windings being in inductive relation to magnetizable material but the magnetizable material and the windings are so arranged that the device is devoid of any motor action. This rectifier is driven in synchronism with the alternating current side of the system, as, for example, by a synchronous motor mechanically connected therewith.

My invention also comprises more specific features of the regulating apparatus including the employment of such a rectifier device to receive the currents from series transformers where regulation in accordance with the current changes of an alternating current circuit is desirable. Another feature of my invention involves the employment of the rectifier device in connection with polyphase regulating circuits where the commutator has a number of segments connected to various points of the winding in each circuit. My invention further comprises specific applications and combinations as hereinafter more fully described.

Another improvement which I have shown herein relates to the apparatus in the direct current circuit employed to regulate the current in the booster field, although this improvement is not, in its broadest phase, limited to the particular dynamo field which is to be regulated. It has been frequently the case that the booster field has been regulated by controlling the field current of a regulating dynamo known as a counter machine, the counter machine and booster field being connected in series and opposed to the voltage of the line or to that of some other machine. Such an arrangement has been advantageous except that the accuracy of the regulation has been affected by variations of speed of the counter machine and by variations of the electromotive force opposing the counter machine, any unforeseen changes in such speed or opposing electromotive force having considerable effect upon the regulation. Moreover, these two variants may sometimes act differentially and sometimes cumulatively. By my invention I employ in opposition to the regulating machine an electromotive force produced by a dynamo whose speed is proportional to that of the counter machine and which gives a voltage proportional to its speed. Thereby when the counter machine voltage is affected by a change of speed the opposing electromotive force is quickly affected, and in the same direction, so that the effect of the change of speed is not substantially felt in the regulating circuit. I produce this opposing electro-motive force by providing two field coils on the opposing or compensating dynamo which are differential in action, one of said field coils being energized by the current through an auxiliary dynamo operating at a speed proportional to that of the regulating dynamo and its opposing dynamo and producing an electromotive force that varies in greater ratio than its speed. Preferably a motor is mechanically connected to the regulating machine, the compensating dynamo and the dynamo for regulating the current in the differential coil of said opposing dynamo.

These and more specific features of my invention will be more fully explained together with the advantages flowing from them in the more detailed description hereinafter.

Referring to the drawings Figure 1 is a diagram illustrating one specific embodiment combining the various features of my invention. Fig. 2 is a diagram showing the connections and winding of the rectifier I employ in the regulating circuit. Figs. 3 and 4 are respectively a longitudinal section and an end view of the same. Fig. 5 is a view similar to Fig. 2 but showing a modified form of rectifier. Fig. 6 is a longitudinal section of the rectifier shown in Fig. 5.

A represents a three phase alternating current main generator. B represents a rotary converter or other form of rectifying device connected at its alternating current end to the generator A, there being in the present instance transformers B' interposed between the two. C is a storage battery and D a booster in series with the battery, the two being connected to the direct current end of the rotary B. An alternating current work circuit may be connected to the conductors between the generator A and the rotary B, or a direct current work circuit may be connected to the direct current circuit leading from the rotary, or there may be both alternating current and direct current work circuits.

In the present instance it is desired that the battery current shall be controlled to vary in such a manner as to keep the load on the main generator A approximately constant whatever be the fluctuations of current in the working circuits or whatever the condition of the battery. To this end the voltage of the booster D is varied by regulating the current in its field winding D'. The booster D is rotated at approximately constant speed by an induction motor E.

The current in the field winding D' is controlled by a certain apparatus to be hereinafter described by changes of current in the field winding H', and the current in that coil is varied by a regulating circuit that includes a rectifier, the current from which is changed according to the changes of alternating current generator load. I will first describe the apparatus for varying the current in said coil H' in accordance with the alternating current changes.

E represents three series transformers whose primaries are in the three legs of the three phase circuit. The secondaries, therefore, generate currents varying with the currents in the different legs of the circuit of the main generator. These transformers therefore form the source of the varying current for regulation purposes.

At F I have indicated three transformers whose primaries are connected to the secondaries of transformers E and whose secondaries are connected to the alternating current end of the rectifier G. The addition of these transformers F is merely a matter of preference or convenience. The direct current end of the rectifier G is connected to the field coil H' before referred to.

Assuming that the direct current output of G is proportional to the alternating current from the segments of transformers F it will be seen that the current in the field coil H varies proportionally to the changes of current on the alternating current generator A. In prior systems of this character this desideratum was not obtained with commercially practicable apparatus. By the provision of the particular type of rectifier G which I have employed this desideratum is obtained. Referring to Figs. 2, 3 and 4 in which I have shown a suitable construction for such rectifier, $g$ represents collector rings to which the conductors from the transformers F are connected through the brushes $g'$. Upon the shaft $G'$ of the rectifier is a laminated core $G^2$ through which pass a number of longitudinal perforations $g^2$. A series of coils are wound upon this core passing through the perforations $g^2$, this winding $g^3$ being the ordinary drum winding. The collector rings are connected to this winding at points 120° apart. At $G^4$ is a commutator of the ordinary type connected at regular intervals to the winding $G^3$ and at numerous points therein. The brushes $G^5$ bearing on this commutator are connected to the field winding H' on the direct current side of the regulating circuit.

No external field magnet is provided and the rectifier G is entirely devoid of motor action, although it will be seen that the iron $G^2$ surrounds and is in inductive relation with the winding $G^3$. The rectifier in the present instance is driven by a synchronous motor J of ordinary type although it is not essential that a special motor should be provided to drive the rectifier, it being immaterial what agent is employed to drive the rectifier at synchronous speed. The essential point about this rectifier is that it should have magnetizable material and windings in inductive relation thereto, the windings and core should preferably be so disposed that there is a magnetic circuit energized by the current in the winding. It is therefore not of importance what type of winding is employed or what particular form the magnetizable material may take so long as the desired action between the windings and the core is achieved. The rotation of the commutator at synchronous speed assures a unidirectional current from brushes $G^5$ if they are properly adjusted in position, while the magnetism in the core smoothes out the pulsations so that the current given out from the brushes is made more nearly continuous. This is due to the magnetic lag as is well understood. Where, as in the present case, the alternating current circuit is a polyphase one, a rotating field is set up and the rectifier should be rotated in the opposite direction from that in which the field rotates. If then the brushes are adjusted at such a position that they will always be in the center of the resultant rotating field a practically continuous voltage will be found across the brushes $G^5$, inasmuch as the rotating field has a fixed position in space relatively to the brushes.

Despite the rotating field there will obviously be no motor reaction so that none of the energy in the regulating circuit can be diverted to the work of propelling the rectifier or propelling the synchronous motor from the rectifier. This is particularly important where series transformers are employed as the source of regulating energy, since by my invention the regulation portion of the system from one end to the other is a true regulation by current changes.

In Figs. 5 and 6 I show a modification of the rectifier which may be used wherever the rectifier of Figs. 2 to 4 may be used, the only difference between the two forms is that the rectifier of Fig. 6 instead of having the single winding $G^3$ has two distinct windings, one $G^6$ connected to the commutator segments and the other $G^7$ connected to the alternating circuit. In this case, as before, the core surrounds both windings, there being two sets of perforations $g^2$ instead of one set thereof.
With this form of rectifier the windings may be so designed as to give any desired ratio of transformation between the direct current and alternating current sides of the rectifier.

In both Figs. 2 and 5 a rectifier is shown directly connected to the transformers E instead of indirectly connected thereto through the transformers J as in Fig. 1.

The operation of so much of the system of Fig. 1 as has so far been described will now be clear. Any change of current on the main alternating current generator will make itself felt in the primary of transformers E and a corresponding change will therefore be felt in the transformers F and so in the currents supplied to the collector rings $g$ of the rectifier. As this rectifier is rotating at synchronous speed and has the rotating field heretofore described but no motor action, the current from the commutator brushes $G^5$ will be a practically smooth direct current and the change occurring in the generator A will be felt proportionally in the circuit through these brushes. The result is that every change of current on the generator A produces a corresponding change in the field coil $H'$. Thus a regulating result is produced whatever may be the character of the dynamo to be regulated by the changes in the coil $H'$. In the present instance this change is intended to effect the booster regulation, and I will now proceed to show how I regulate the booster voltage in accordance with changes in its coil.

H is the armature of a counter machine or exciter or regulating dynamo upon the field magnet of which is wound the regulating coil $H'$ already referred to. The armature H is in series with the booster field winding $D'$ so that the booster field current is determined by the current generated by the armature H. This armature is rotated by the motor K, in this case a self exciting motor. Such a motor will maintain a constant speed as long as the frequency of the current on its supplying circuit remains constant. But in such systems, particularly where the main alternating current generator is driven by water power or is an inverted rotary, the frequency of the main alternating current is subject to considerable variation. If, therefore, the armature H was used as an ordinary exciter for the field $D'$ or as an ordinary counter machine connected across the direct current circuit, the changes of speed caused by this change of frequency would introduce a disturbing factor to the regulation, and I have found by experience that such a disturbing factor is a very substantial one. To neutralize this disturbing factor I provide in opposition to the armature H a source of electromotive force that has a fixed relation with the speed of the armature H falling as it falls and rising as it rises. The opposing electro-motive force is generated by the armature L which is preferably mechanically connected with the armature H being driven by the same synchronous motor K. $L'$ is a shunt field winding for the armature L which is preferably wound to give a high flux density. This machine also has a second field winding $L^2$, the current to which is supplied by a separate exciter M which is also preferably connected mechanically with the other three motors. The field winding for this machine in the present instance includes a shunt field winding $M'$ and a series field winding $M^2$ and the field magnet is preferably wound for low flux density. The two machines H and L also have field windings $H^2$ and $L^3$ in series with their armatures in order to compensate as near as may be for the effects of armature reaction. The coil $L^2$ is arranged to have an opposite effect upon the armature L to that of the coil $L'$.

Assuming a constant speed then any change of current in the coil $H'$ due to changes in the alternating current circuit, as heretofore described, will correspondingly change the voltage of the regulating dynamo H and, as under these circumstances, the opposing voltage of the armature L is not changed, the effect of the change of voltage on armature H will be to cause a current to traverse the circuit containing the armature H, coils $H^2$ and $L^3$, the armature L and the booster field winding $D'$, this current varying in direction and amount according to the amount of current in the coil $H'$. It is understood that if the system is adjusted in the more usual manner for operating this general class of systems, the current in coil $H'$ when there is a predetermined average current on the generator A, will be such that the voltage of the regulating dynamo H will exactly equal that of the opposing dynamo L so that no current flows through the booster field $D'$, and the battery is floating across the line. Any increase of current on the generator causes an increase of current in the coil $H'$ and therefore the voltage of H will rise above that of $L'$ causing a current to flow in the booster field in one direction. Any decrease in current on generator A below the predetermined average will cause a decrease of current in the coil $H'$ reducing the voltage of H below that of L and causing a current to flow in the booster field winding in the opposite direction. Therefore every change of current on the generator A will cause the booster voltage to change to vary the battery current for charge or discharge as is needed.
If, however, the frequency of the main generating circuit changes so that the speed of the motor K and therefore of the regulating dynamo changes, the disturbing effect that this would cause is neutralized because such change of speed markedly changes the voltage produced by the exciter M. Suppose that this change of speed is an increase. Then the voltage of the exciter M will increase in even greater ratio and a marked increase of current is felt in the coil $L^2$. If this coil $L^2$ were not provided the voltage of the armature L would rise in greater ratio than the change of speed because of the characteristic caused by the shunt winding $L'$. The increase of current in the coil $L^2$, however, acts to neutralize this tendency to disproportionally increase the voltage of L, the net result being that the voltage of L, is varied in substantially exact proportion to the variation of the speed. It will be understood that a decrease of speed by markedly decreasing the current in the coil $L^2$ offsets the drooping characteristic caused by the winding $L'$ in like manner. It will also be understood that the compensation I have described would not necessarily hold true for very wide limits, but such compensation can be obtained with great exactness within the limits of speed changes to which these machines will be subjected in actual practice.

The windings of the machines L and M need not necessarily be specifically as shown and described. An important point is that the machine M should have a sharply rising characteristic, that is, its voltage should rise in greater proportion than its speed increases, and that the current from this machine should so affect the field flux of the machine L as to cause the latter machine to have a voltage substantially proportional to its speed within the limits of its operation.

While the system I have disclosed combines the various features of my invention, yet it is obvious that the regulating circuit with its rectifier G may be employed with many widely varying types of systems, and it is also obvious that the compensation for changes of speed of the regulating dynamo H may be applied to other types of systems that those shown, including systems in which such changes of speed are caused by derangements other than frequency changes. I do not, therefore, desire to limit myself to the employment of the different features of my invention in one and the same system, nor generally to any mere details of construction and arrangement which have been described by me only for the purpose of fully illustrating one specific embodiment of my invention.

Having thus described my invention what I claim as new and desire to protect by Letters Patent is:—

1. The combination of an alternating current circuit, and a direct current circuit, one being a regulating circuit to be governed by fluctuations in the other, a rectifying device connecting the two circuits having magnetic induction, but devoid of motor action and means for rotating said rectifying device synchronously.

2. In a regulating apparatus an alternating current circuit, and a direct current circuit, one a regulating circuit to be governed by fluctuations in the other, a device having magnetic material and windings in inductive relation thereto but arranged to have no motor reaction therewith, connections from said windings to the alternating current circuit and to a commutator, brushes engaging the commutator and connected to the direct current circuit, and means for relatively rotating the brushes and the windings.

3. In a regulating apparatus an alternating current circuit, one a regulating circuit to be governed by fluctuations in the other, a device having magnetic material and windings in inductive relation thereto but arranged to have no motor reaction therewith, connections from said windings to the alternating current circuit and to a commutator, the segments of which are connected successively to a number of points in each division of said windings, brushes bearing on the commutator and connected to the direct current circuit, and means for relatively rotating the brushes and the windings.

4. The combination of an alternating current circuit, a series transformer therein, a rectifying device connected to said transformer having magnetic induction but devoid of motor action, a regulating direct current circuit connected to the rectifying device, and means for rotating said rectifying device synchronously.

5. The combination of a polyphase alternating current circuit, series transformers therein, a rectifying device connected to said transformers having magnetic induction but devoid of motor action, a regulating circuit connected to said rectifying device and means for rotating said rectifying device synchronously.

6. In a regulating apparatus, an alternating current circuit subject to fluctuations of current, a series transformer therein, a device having magnetic material and windings in inductive relation thereto but arranged to have no motor reaction therewith, connections from said windings to said transformer, a commutator also connected to said windings, brushes bearing on the commutator, a regulating circuit connected to said brushes and means for relatively rotating the brushes and windings.

7. In a regulating apparatus, a polyphase alternating current circuit subject to fluctuations in current, series transformers therein, a device having magnetic material and windings in inductive relation thereto but arranged to have no motor reaction therewith, connections from said windings to said transformers, a commutator also connected to said windings, brushes bearing on the commutator, a regulating circuit connected to said brushes and means for relatively rotating the brushes and windings.

8. In a regulating apparatus, an alternating current circuit subject to fluctuations of current, a series transformer therein, a device having magnetic material and windings in inductive relation thereto but arranged to have no motor reaction therewith, connections from said windings to said transformer, a commutator the segments of which are connected successively to a number of points in each division of said windings, brushes bearing on the commutator, a regulating circuit connected to said brushes and means for relatively rotating the brushes and windings.

9. The combination of an alternating current circuit, a series transformer therein, a rectifying device connected to said transformer having magnetic induction but devoid of motor action, a regulating direct current circuit connected to the rectifying device and an alternating current synchronous motor mechanically connected to the rectifying device.

10. The combination of a polyphase alternating current circuit, series transformers therein, a rectifying device having magnetizable material and windings in inductive relation thereto but devoid of motor reaction therewith, a commutator connected to said windings, brushes bearing upon said commutator and connected to a regulating circuit, and means for synchronously rotating said windings and brushes respectively.

11. The combination of a polyphase alternating current circuit, series transformers therein, a rectifying device having magnetizable material and windings in inductive relation thereto but devoid of motor reaction therewith, a commutator the segments of which are connected successively to a number of points in each phase of said windings, brushes bearing upon said commutator and connected to a regulating circuit, and means for synchronously rotating said windings and brushes respectively.

12. In a regulating apparatus, an alternating current circuit subject to fluctuations of current, a series transformer therein, a device having magnetic material and windings in inductive relation thereto but arranged to have no motor reaction therewith, connections from said windings to said transformer, a commutator also connected to said windings, brushes bearing on the commutator, a regulating circuit connected to said brushes and an alternating current synchronous motor mechanically connected to the rectifying device.

13. In a regulating apparatus, an alternating current circuit, series transformers therein, a device having magnetic material and windings in inductive relation thereto but arranged to have no motor action, connections from said windings to said transformers, commutator brushes engaging the commutator, a direct current regulating circuit connected to the brushes, and means for relatively rotating the brushes and the windings.

14. In a regulating apparatus an alternating current circuit and a direct current circuit, one a regulating circuit to be governed by fluctuations in the other, a device having magnetic material and windings in inductive relation thereto, said magnetic material forming a closed magnetic path but arranged so that there is no motor reaction, connections from said windings to the alternating current circuit, and to a commutator, brushes bearing on said commutator and connected to the direct current circuit, and means for relatively rotating the brushes and the windings.

15. In a regulating apparatus, an alternating current circuit subject to fluctuations of current, a device having magnetic material and windings, the magnetic material forming a closed magnetic circuit around said windings but arranged to have no motor reaction therewith, connections from said windings to the alternating current circuit, a commutator also connected to said windings, brushes bearing on the commutator, a regulating circuit connected to said brushes, and means for relatively rotating the brushes and windings.

16. In a regulating apparatus a polyphase alternating current circuit, a direct current circuit, one a regulating circuit to be governed by fluctuations in the other, a device having magnetic material and windings connected to said alternating current circuit in inductive relation thereto but having no motor reaction therewith, a commutator connected to said windings and brushes bearing thereon connected to the direct current circuit, and a synchronous alternating current motor mechanically connected to drive said brushes relatively to said windings.

17. In a regulating apparatus a polyphase alternating current circuit, a direct current circuit, one a regulating circuit to be governed by fluctuations in the other, a device having magnetic material and windings connected to said alternating current circuit in inductive relation thereto but having no motor reaction therewith, a commutator the segments of which are connected successively to a number of points in each phase of said windings and brushes bearing thereon connected to the direct current circuit, and a synchronous alternating current motor mechanically connected to drive said brushes relatively to said windings.

18. In a regulating apparatus, an alternating current circuit subject to fluctuations, a dynamo electric machine, a direct current circuit connected to the regulating circuit of said dynamo electric machine, a rectifying device connecting said alternating and direct current circuits, and having magnetic material and windings in inductive relation thereto but so arranged as to be devoid of motor action, a commutator connected to said windings and brushes bearing thereon connected to said direct current circuit, and means for synchronously rotating said brushes and windings relatively to each other.

19. In a regulating apparatus an alternating current circuit subject to fluctuations, a dynamo electric machine, a direct current circuit connected to the regulating circuit of said dynamo electric machine, a rectifying device connecting said alternating and direct current circuits, and having magnetic material and windings in inductive relation thereto but so arranged as to be devoid of motor action, a commutator the segments of which are connected successively to a number of points in each division of said windings, brushes bearing thereon connected to said direct current circuit, and means for synchronously rotating said brushes and windings relatively to each other.

20. In a regulating apparatus, an alternating current circuit subject to fluctuations, a series transformer therein a dynamo electric machine, a direct current circuit connected to the regulating circuit of said dynamo electric machine, a rectifying device connected to said series transformer and having magnetic material and windings in inductive relation thereto but so arranged as to be devoid of motor action, a commutator connected to said windings and brushes bearing thereon connected to said direct current circuit, a synchronous motor mechanically connected to relatively rotate said brushes and windings.

21. In a regulating apparatus a fluctuating alternating current circuit, a direct current circuit, a rectifying device connecting said circuits, a storage battery and booster connected to said direct current circuit, a rectifying device connected to and controlled by fluctuations in said alternating current circuit and having magnetic material and windings in inductive relation thereto but so arranged as to have no motor reaction therewith, a commutator connected to said windings and brushes bearing thereon connected to a controlling circuit for the booster in the battery circuit, and means for relatively rotating said brushes and windings.

22. In a regulating apparatus a fluctuating alternating current circuit, and a series transformer therein, a direct current circuit, a rectifying device connecting said circuits, a storage battery and booster connected to said direct current circuit, a rectifying device connected to said series transformer and controlled by fluctuations in said alternating current circuit and having magnetic material and windings in inductive relation thereto but so arranged as to have no motor reaction therewith, a commutator connected to said windings and brushes bearing thereon connected to a controlling circuit for the booster in the battery circuit, and a synchronous motor mechanically connected so as to relatively rotate said brushes and windings.

23. An apparatus for regulating a dynamo in accordance with the fluctuations of current in a circuit comprising a regulating dynamo having a field winding in said circuit, means for driving said dynamo, a compensating dynamo connected in series/in the same circuit, means for varying the electromotive force of the compensating dynamo proportionally to the speed changes of the regulating dynamo, and a controlling coil for the regulated dynamo in the circuit of the regulating and compensating dynamos.

24. An apparatus for regulating a dynamo in accordance with the fluctuations of current in a circuit comprising a regulating dynamo having a field winding in said circuit, means for driving said dynamo, a compensating dynamo connected in series in the same circuit, and driven at a speed proportional to that of the regulating dynamo, means for varying the electro-motive force of the compensating dynamo proportionally to its speed changes, and a controlling coil for the regulated dynamo in the circuit of the regulating and compensating dynamos.

25. The combination of a dynamo to be regulated, a regulating dynamo therefor controlled by the fluctuations of the regulating current, and a compensating dynamo arranged to modify the effect of said regulating dynamo to compensate for speed changes thereof.

26. The combination of a dynamo to be regulated, a regulating dynamo therefor, and suitable means for driving the same, and a compensating dynamo arranged to modify the effect of said regulating dynamo to compensate for speed changes thereof.

27. The combination of a dynamo to be regulated, an alternating current circuit, a regulating dynamo driven in synchronism with the alternating current source of supply, and means for neutralizing changes in said regulating dynamo due to changes of frequency in the alternating current circuit.

28. The combination of a dynamo to be regulated, a regulating dynamo therefor, and suitable means for driving the same, a compensating dynamo mechanically connected to said regulating dynamo and arranged to modify the regulating effect of the same to compensate for speed changes thereof.

29. The combination of a dynamo to be regulated, a regulating dynamo therefor and suitable means for driving the same, a compensating dynamo mechanically connected to said regulating dynamo having an electro-motive force proportional to its speed and opposed to that of the regulating dynamo.

30. The combination of a dynamo to be regulated, a regulating dynamo therefor and suitable means for driving the same, a compensating dynamo driven at a speed proportional to that of the regulating dynamo, and having its electro-motive force oppose that of the regulating dynamo, and an exciter for the compensating dynamo also driven at said proportional speed.

31. The combination of a dyanmo to be regulated, a regulating dynamo therefor, and suitable means for driving the same, and a compensating dynamo whose electromotive force opposes that of the regulating dynamo, and a dynamo for regulating the field strength of the compensating dynamo, the three last named dynamos being driven at proportionate speeds.

32. The combination of a dynamo to be regulated, a regulating dynamo therefor, and suitable means for driving the same, and a compensating dynamo whose electromotive force opposes that of the regulating dynamo, and a dynamo for regulating the field strength of the compensating dynamo, the three last named dynamos being mechanically connected together.

33. The combination of a dynamo to be regulated, a regulating dynamo therefor and suitable means for driving the same, a regulating winding on the dynamo to be regulated connected in circuit with the regulating dynamo, and a compensating dynamo arranged to modify the effect of said regulating dynamo to compensate for speed changes thereof.

34. The combination of a dynamo to be regulated, a regulating dynamo therefor, and suitable means for driving the same, and a compensating dynamo whose electromotive force opposes that of the regulating dynamo, a dynamo for regulating the field strength of the compensating dynamo, the three last named dynamos being driven at proportionate speeds, and a regulating winding on the dynamo to be regulated, said winding to be connected in series with the armature of said regulating dynamo.

35. The combination of a dynamo to be regulated, a regulating dynamo therefor and suitable means for driving the same, a regulating winding on the dynamo to be regulated connected in circuit with the regulating dynamo, and a compensating dynamo having differential field winding, said differential field so regulated that the electromotive force of the compensating dynamo will compensate for speed changes of said dynamos.

36. The combination of a dynamo to be regulated, a regulating dynamo therefor and suitable means for driving the same, a regulating winding on the dynamo to be regulated connected in circuit with the regulating dynamo and a compensating dynamo having differential field windings, said differential field excited by a dynamo driven at a proportionate speed to said regulating, and compensating dynamo and having a rising voltage characteristic with regard to speed.

37. The combination of a dynamo to be regulated, a regulating dynamo therefor and suitable means for driving the same, a regulating winding on the dynamo to be regulated, connected in circuit with the regulating dynamo, and a compensating dynamo having a shunt field winding giving a low voltage characteristic with regard to speed variations, and a differential field winding excited by a dynamo driven at proportionate speed to said regulating dynamo, and having a high voltage characteristic with respect to speed variations.

38. In a regulating apparatus, a fluctuating alternating circuit, a regulating circuit, a rectifying device connected to said alternating current circuit and delivering energy to said regulating circuit in accordance with the fluctuations in said alternating current circuit, a dynamo, a regulating dynamo for the same, said regulating dynamo controlled by said regulating circuit, a compensating dynamo connected in circuit with said regulating dynamo and compensating for speed changes thereof.

39. In a regulating apparatus, a fluctuating alternating circuit, a regulating circuit, a rectifying device of the induction type but devoid of motor action connected to said alternating current circuit and delivering energy to said regulating circuit in accordance with the fluctuations in said alternating current circuit, a dynamo, a regulating dynamo for the same, said regulating dynamo controlled by said regulating circuit, a compensating dynamo connected in circuit with said regulating dynamo and compensating for speed changes thereof.

In testimony whereof, I have signed my name to this specification, in the presence of two subscribing witnesses.

EDWARD VAN WAGENEN.

Witnesses:
EDWIN SEGER,
ANNA DALY.